United States Patent [19]
Guenther

[11] Patent Number: 5,426,660
[45] Date of Patent: Jun. 20, 1995

[54] STRIPLINE LASER HAVING HF VOLTAGE DISTRIBUTION OPTIMIZED BY GROUNDING SPRINGS

[75] Inventor: Wolfgang Guenther, Munich, Germany

[73] Assignee: Siemens Aktiengesellschaft, Munich, Germany

[21] Appl. No.: 126,058

[22] Filed: Sep. 23, 1993

[30] Foreign Application Priority Data

Sep. 30, 1992 [DE] Germany .................... 42 32 838.1

[51] Int. Cl.⁶ .............................................. H01S 3/097
[52] U.S. Cl. ....................................... 372/82; 372/95; 372/34; 372/98; 372/87
[58] Field of Search ................. 372/82, 87, 64, 95, 372/98, 34

[56] References Cited

U.S. PATENT DOCUMENTS

| | | | |
|---|---|---|---|
| 4,352,188 | 9/1982 | Griffith | 372/82 |
| 5,123,028 | 6/1992 | Hobart et al. | 372/64 |
| 5,197,079 | 3/1993 | Krueger et al. | 372/82 |
| 5,220,576 | 6/1993 | Krueger et al. | 372/87 |

*Primary Examiner*—Léon Scott, Jr.
*Attorney, Agent, or Firm*—Hill, Steadman & Simpson

[57] ABSTRACT

A stripline laser has its HF voltage distribution optimized by grounding springs. A grounded electrode is connected to an outside wall with electrically conductive connector elements, and is preferably connected thereto at a plurality of locations along its axial extent.

5 Claims, 1 Drawing Sheet

STRIPLINE LASER HAVING HF VOLTAGE DISTRIBUTION OPTIMIZED BY GROUNDING SPRINGS

BACKGROUND OF THE INVENTION

The invention is directed to a HF-excited, diffusion-cooled stripline laser having a grounding electrode and a HF metal electrode arranged thereabove which are provided with means for mutual fixing. Respective cooling channels are provided and between which a discharge gap is formed. Parallel inductances are attached to the electrodes and are uniformly distributed over their length. An unstable resonator is provided. An electrically conductive, vacuum-tight housing containing a $CO_2$ lasing gas surrounds the resonator and the electrodes and is composed of a first and a second face plate and of a cylindrical outside wall connected thereto.

Apart from the parallel inductances, such a stripline laser is disclosed by EP-A-0 477 865. Parallel inductances, but only for waveguide lasers, are disclosed by U.S. Pat. No. 4,352, 188.

Until a few years ago, insurmountable difficulties opposed the design of a $CO_2$ high-power laser in a compact structure. Due to the physical processes in the laser excitation, the efficiency is highly dependent on a gas temperature that is not excessively high, i.e., on an effective elimination of excess heat from the laser gas in practice. Given diffusion-cooled $CO_2$ lasers, wherein the heat is conveyed by a stationary thermal conduction process from the hottest location in the center of the laser plasma to the cooled walls of the discharge vessel, it has been shown that the laser output power is only dependent on the length and not on the diameter of the discharge. As a result, complicated convolution designs were therefore developed on the one hand in order to retain compact dimensions of the laser, despite powers up into the kW range. On the other hand, rapidly flowed, i.e. convection-cooled lasers, were developed. Rapidly flowed lasers of the power class 500 up to more than 10,000 W are currently commercially obtainable. These lasers, which are not provided for sealed-off operation, however, are bulky, have a high power-associated weight, and are dependent on a cost-unfavorable, external gas supply and on pumping for rapid gas circulation.

For the stated reasons, only what are referred to as waveguide lasers having powers up to 200 W were previously obtainable as compact, diffusion-cooled $CO_2$ lasers. In the meantime, however, the fundamentals of a stripline laser have been disclosed, for example by EP-A-0 305 893, the discharge space thereof—by contrast to the waveguide laser—not having a quadratic cross section but being based on planar waveguide structures that are open toward the side. The combination of such a quasi-one-dimensional waveguide with an unstable resonator in the orthogonal direction thereby enables a diffraction-limited, fundamental mode laser emission. Given this stripline design, the heat is absorbed in large-area fashion by the closely neighboring electrodes, and is then eliminated therefrom with the assistance of suitable coolants. It is therefore no longer necessary to pump the laser gas itself through the discharge space with a special cooling circulation.

The article by R. Vowack et al, "Diffusionsgekuehlte $CO_2$ Hochleistungslaser in Kompaktbauweise" in "Laser und Optoelektronik", 23(3)/1991 is referenced to the prior art of stripline lasers. Up to now, considerable difficulties still oppose the conversion of the above-described stripline laser concept into a structure compatible with practice. The selection of a suitable electrode material proved especially problematical. The electrodes serve, on the one hand, for coupling in the high-frequency energy, i.e. are loaded with high currents. Moreover, they should form an optimally loss-free optical waveguide and eliminate the heat well. Over and above this, only component parts and materials are suitable with which an equilibrium condition of the gas mixture in the laser that is stable over the long term is guaranteed. In the article, for example, the anticipated, undesirably high $CO_2$ decomposition due to copper electrodes is discussed. Further demands made of the construction of cooled electrodes provided with means for mutual distancing are the optimization of the weight, adequate stability with respect to mechanical or thermal stresses and, last but not least, cost-beneficial manufacturability.

For resolving these and other problems, the European application bearing Ser. No. 92114862.3, which does not enjoy prior publication, proposed that each electrode is designed as a composite composed of a carrier part having a mechanically stable profile and a plate-shaped electrode part with integrated cooling that faces toward the discharge gap and is hard-soldered or welded to the carrier part. The carrier part should thereby preferably comprise an approximately rectangular cross section. In this design, however, the problem of the HF voltage distribution between the two electrodes arranged above one another and the cylindrical outside wall that surrounds them, which simultaneously serves as HF shielding and as an outer conductor, is not yet resolved in a completely satisfactory fashion. These problems arise despite parallel inductances since, differing from waveguide lasers, the grounding electrodes and the outside wall are not identical for thermal reasons.

SUMMARY OF THE INVENTION

An object of the invention is comprised in creating a laser of the type initially cited with which an improved HF voltage distribution can be achieved without great design expense.

This object is inventively achieved in a stripline laser of the type initially cited in that the grounding electrode has at least one location along its axial extent connected to the outside wall with electrically conductive connector elements.

DESCRIPTION OF THE PREFERRED EMBODIMENTS

Figure 1:
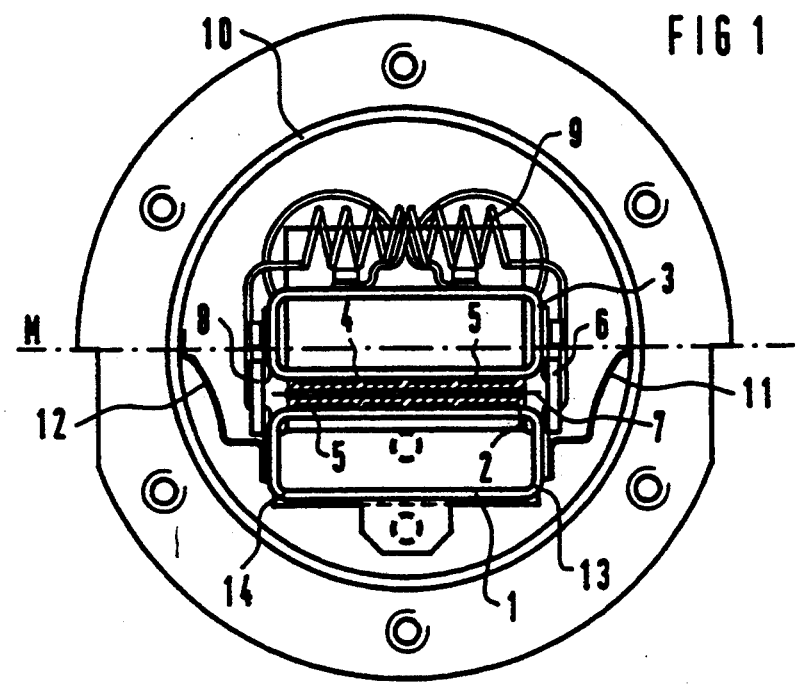
FIG. 1 illustrates schematically and in section, an inventive embodiment of a grounding spring given a composite electrode pair.

FIG. 1 shows a grounding electrode composed of a rectangular carrier part 1 and a corresponding, plate-shaped electrode part 2. The HF electrode 3, 4 is situated thereabove, this being likewise implemented as a composite electrode. Cooling channels 5 are integrated therein, just as in the grounding electrode. The two composite electrodes 1, 2 and 3, 4 are separated, on the one hand, by a discharge gap 7; on the other hand, they are mutually fixed and held with spacers 6 and 8. An inductance 9 arranged above the HF electrode 3, 4 is also shown, this inductance, together with further coils, serving the purpose of homogenizing the laser discharge along the electrode parts 2, 4. The laser interior is closed vacuum-tight from the outside by a cylindrical outside wall 10 and by face plates (not shown). The gas mixture employed for discharge is neither renewed nor employed for cooling.

The vacuum-tight outside wall 10 is executed as an electrically conductive jacket tube of V2A steel and simultaneously serves as a HF shield and as an outer conductor. Metal springs 11 and 12 are shown in FIG. 1, these being respectively secured to one side of the grounding electrode 1, 2 and being each respectively conductively connected to the inside of the outside wall 10. The metal springs 11 and 12 are preferably arranged such that they end approximately at the level of the middle line M at locations of the outside wall 10 that lie diametrically approximately opposite one another. The connector elements prevent differences in HF potential from being formed between grounding electrode 1, 2 and the outside wall. The edges 13 and 14 of the grounding electrode 1, 2 that are relatively adjacent to the outside wall 10 have thereby proven to be especially critical. A voltage drop-off of the grounding electrode 1, 2 toward the outside wall 10 should be particularly prevented thereat but should also be prevented overall in the lower half of the laser tube since such a drop-off would ultimately deteriorate the efficiency of the discharge between the electrode parts 2 and 4. It is especially beneficial in the invention to also provide a row or series of further metal spring pairs 11 and 12 at approximately uniform intervals from one another along the grounding electrode 1, 2, in addition to providing the grounding spring pair 11 and 12 shown in FIG. 1. A HF voltage distribution between the HF electrode 3, 4 on the one hand and the grounding electrode 1, 2 plus the outside wall 10 on the other hand, which is otherwise not unambiguously defined in the same way despite inductances 9, is guaranteed on the basis of the techniques of the invention.

Figure 2:
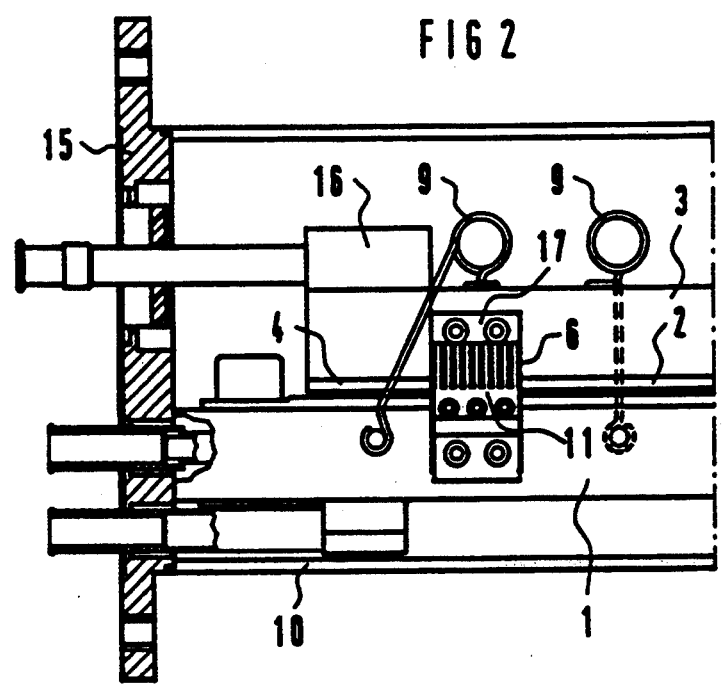
FIG. 2 is a sectional side view of the embodiment of FIG. 1.

FIG. 2 shows a side view of a part of a laser comprising composite electrodes and grounding springs. The base electrode 1, 2 is rigidly connected to a face plate 15. The HF electrode 3, 4 is arranged above it and is fixed and held by spacers 6 composed of metal laminae 17 and insulating spacers. The cooling of a first resonator mirror 16 and of the composite electrodes is assured by the delivery of cooling water. A plurality of inductances 9 are also located within the vacuum-tight outside wall 10 along the HF electrode 3, 4. The metal spring 11 shown in FIG. 2 can be advantageously designed in multi-fingered fashion and can be secured to metal laminae 17 that are in turn electrically conductively connected to the sides of the carrier part 1 of the grounding electrode 1, 2. The insulating spacers 6 are also secured to these laminae 17.

V2A steel can be advantageously employed for the rectangular profiles 1 and 3, whereby only the actual electrode parts 2 and 4 must be composed of copper because of the necessary HF and thermal conductivity. The metal laminae 17 of the spacers 6, 8 and the inductances 9 for a uniform voltage distribution can advantageously be directly welded to the electrode profile 1, 3 of V2A steel that is not surface-treated. It is also advantageous for improving the HF conductivity to copperplate the inductances 9 outside the weld locations.

Although various minor changes and modifications might be proposed by those skilled in the art, it will be understood that we wish to include within the scope of the patent warranted hereon all such changes and modifications as reasonably come within my contribution to the art.

I claim as my invention:

1. A high-frequency excited $CO_2$ stripline laser, comprising:
    an electrically conductive, vacuum-tight housing formed of an electrically conductive cylindrical outside wall and first and second face plates at opposite ends of a cylinder formed by the cylindrical outside wall;
    a lasing gas comprising $CO_2$ within the vacuum-tight housing;
    a grounding electrode extending longitudinally along the housing and mounted to the housing;
    a high frequency metal electrode extending longitudinally along the housing and arranged directly above the grounding electrode and supported to the grounding electrode by spacers, a discharge gap being formed between the grounding electrode and the high frequency metal electrode;
    both the grounding electrode and the HF metal electrode each having a cooling channel running longitudinally therealong;
    a plurality of inductances connected to the high frequency electrode, said inductances being uniformly spaced at a plurality of locations longitudinally along the high frequency electrode;
    an unstable resonator positioned at the discharge gap and connected to the high frequency electrode; and
    the grounding electrode being connected to the outside wall with a plurality of electrically conductive connector elements at a plurality of locations along the longitudinal extent of said grounding electrode and wherein a first end of each of the conductive connector elements being connected to the grounding electrode and an opposite second end of each connector element being connected to an inside of the cylindrical outside wall of the housing, whereby an improved high frequency voltage distribution along the discharge gap is achieved when the laser is operated.

2. A stripline laser according to claim 1 wherein a plurality of said connector elements are provided, and wherein they are positioned at approximately a uniform spacing along the longitudinal extent of the grounding electrode.

3. A stripline laser according to claim 1 wherein the connector elements comprise multi-fingered metal springs and wherein the second end of each of said connector elements connects to the inside of the cylindrical outside wall at a mid level height of the housing, said grounding electrode being located below said midlevel height in the housing.

4. A stripline laser according to claim 1 wherein the connector elements are attached to said spacers which connect said grounding electrode to said high frequency electrode.

5. A high-frequency excited $CO_2$ stripline laser, comprising:
    an electrically conductive, vacuum-tight housing formed of an electrically conductive cylindrical outside wall and first and second face plates at opposite ends of a cylinder formed by the cylindrical outside wall;

a lasing gas within the vacuum-tight housing;

a grounding electrode extending longitudinally along the housing and mounted to the housing;

a high frequency metal electrode extending longitudinally along the housing and arranged directly above the grounding electrode and supported to the grounding electrode by spacers, a discharge gap being formed between the grounding electrode and the high frequency metal electrode;

both the grounding electrode and the HF metal electrode each having a cooling channel running longitudinally therealong;

an inductance connected to the high frequency electrode;

an unstable resonator positioned at the discharge gap and connected to the high frequency electrode; and the grounding electrode being connected to the outside wall with at least one electrically conductive connector element at at least one location along the longitudinal extent of said grounding electrode and wherein a first end of the conductive connector element is connected to the grounding electrode and an opposite second end is connected to an inside of the cylindrical outside wall of the housing, whereby an improved high frequency voltage distribution along the discharge gap is achieved when the laser is operated.

* * * * *